United States Patent
Hamza et al.

(10) Patent No.: US 7,421,097 B2
(45) Date of Patent: Sep. 2, 2008

(54) FACE IDENTIFICATION VERIFICATION USING 3 DIMENSIONAL MODELING

(75) Inventors: Rida M. Hamza, Inver Grove Heights, MN (US); Michael E. Bazakos, Bloomington, MN (US); Murray J. Cooper, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 659 days.

(21) Appl. No.: 10/446,521

(22) Filed: May 27, 2003

(65) Prior Publication Data

US 2004/0240711 A1 Dec. 2, 2004

(51) Int. Cl.
G06K 9/00 (2006.01)
G06K 5/00 (2006.01)
G05B 19/00 (2006.01)

(52) U.S. Cl. .................. 382/118; 235/382; 340/5.2; 902/3; 902/5

(58) Field of Classification Search .................. None
See application file for complete search history.

(56) References Cited

U.S. PATENT DOCUMENTS

| | | | |
|---|---|---|---|
| 4,975,969 A * | 12/1990 | Tal | 382/116 |
| 5,608,387 A | 3/1997 | Davies | 340/825.34 |
| 5,659,625 A * | 8/1997 | Marquardt | 382/118 |
| 5,933,527 A | 8/1999 | Ishikawa | 382/190 |
| 5,978,100 A * | 11/1999 | Kinjo | 358/453 |
| 6,002,782 A * | 12/1999 | Dionysian | 382/118 |
| 6,026,188 A * | 2/2000 | Dionysian | 382/216 |
| 6,072,894 A | 6/2000 | Payne | 382/118 |
| 6,094,498 A | 7/2000 | Okumura | 382/118 |
| 6,111,517 A | 8/2000 | Atick et al. | 340/825.34 |
| 6,160,799 A | 12/2000 | Krause et al. | |
| 6,181,806 B1 | 1/2001 | Kado et al. | 382/118 |
| 6,301,370 B1 | 10/2001 | Seffens et al. | 382/103 |
| 6,356,650 B1 | 3/2002 | Wirtz | |

(Continued)

FOREIGN PATENT DOCUMENTS

EP 1134691 A2 9/2001

(Continued)

OTHER PUBLICATIONS

Cognitec SmartGate Photograph.

(Continued)

Primary Examiner—Charles Kim
(74) Attorney, Agent, or Firm—Kris T. Fredrick

(57) ABSTRACT

A checkpoint screening system uses multiple cameras to provide images at different angles of a person to be screened. Different features extracted from the images at different angles are compared to a profile associated with the person to be screened. In one embodiment, the person first provides an ID, such as a drivers license or other identification, and the profile is retrieved. If a match is detected, the person may continue through the checkpoint. If no match is detected, the person may be directed to a different path through the checkpoint for further verification of identity. A registration process is used to enroll members and obtain a member profile. Three camera angles are utilized to provide a three dimensional image. Each image is independently compared against the profile and the decisions from such comparisons are weighted. The profile is regressively updated and weighted if a match is detected.

24 Claims, 5 Drawing Sheets

U.S. PATENT DOCUMENTS

| | | | |
|---|---|---|---|
| 6,381,346 B1 | 4/2002 | Eraslan | 382/118 |
| 6,430,306 B2 * | 8/2002 | Slocum et al. | 382/118 |
| 6,430,307 B1 | 8/2002 | Souma et al. | 382/118 |
| 6,463,163 B1 | 10/2002 | Kresch | 382/103 |
| 6,496,594 B1 | 12/2002 | Prokoski | 382/118 |
| 6,496,595 B1 | 12/2002 | Puchek et al. | 382/124 |
| 6,498,970 B2 | 12/2002 | Colmenarez et al. | 701/36 |
| 6,504,944 B2 | 1/2003 | Mihara et al. | 382/118 |
| 6,526,161 B1 | 2/2003 | Yan | 382/118 |
| 6,532,011 B1 | 3/2003 | Francini et al. | 345/420 |
| 6,608,914 B1 | 8/2003 | Yamaguchi et al. | |
| 6,775,397 B1 * | 8/2004 | Hamalainen | 382/118 |
| 6,873,713 B2 * | 3/2005 | Okazaki et al. | 382/118 |
| 6,947,578 B2 * | 9/2005 | Lee | 382/116 |
| 6,963,659 B2 * | 11/2005 | Tumey et al. | 382/116 |
| 7,039,221 B1 * | 5/2006 | Tumey et al. | 382/118 |
| 7,272,267 B1 * | 9/2007 | Nakajima | 382/294 |
| 2001/0043727 A1 | 11/2001 | Cooper | 382/118 |
| 2002/0039447 A1 | 4/2002 | Shniberg et al. | 382/224 |
| 2002/0048399 A1 | 4/2002 | Lee et al. | 382/165 |
| 2003/0053662 A1 | 3/2003 | Evoy | |
| 2003/0059124 A1 * | 3/2003 | Center, Jr. | 382/278 |
| 2003/0161537 A1 * | 8/2003 | Maeda et al. | 382/218 |
| 2004/0264745 A1 * | 12/2004 | Gu et al. | 382/118 |
| 2005/0280502 A1 * | 12/2005 | Bell | 340/5.83 |

FOREIGN PATENT DOCUMENTS

| | | |
|---|---|---|
| JP | 11175718 | 7/1999 |
| WO | WO-02/09024 A1 | 1/2002 |
| WO | WO-03/003610 A1 | 1/2003 |

OTHER PUBLICATIONS

"Cognitec Systems GmbH", www.cognitec.com, Corporate Information, (Jan. 2003), 11 pages.

"FaceVACS", *Cognitec Systems GmbH Website*, http://www.congnitec-systems.de/Products.html, 14 pages.

"Facial-Recognition Solutions Roudup", *BiometriTech Website*, http://www.biometritech.com/features/roundup051502.html, (May 15, 2002), 9 pages.

"Real-Time Facial Surveillance and Identification System", *FaceIt Argus*, Product Brochure. Visionics Corporation, Jersey City, NJ, (2002), 5 pages.

Beymer, David, et al., "Face Recognition From One Example View", *Proceedings of the Fifth International Conference on Computer Vision*, Massachusetts Institute of Technology, Cambridge, Massachusetts, (Jun. 1995), 500-507.

Chellappa, Rama, et al., "Human and Machine Recognition of Faces: A Survey", *Proceedings of the IEEE*, 83 (5), (May 1995), 705-741.

Liao, Fong-Yuan, et al., "Determining Pose in a Multiple-View Based 3-D Object Recognition System", *Proceedings of 1991 IEEE International Conference on Systems, Man, and Cybernetics, 1*, Omni Charlottesville Hotel and the University of Virginia, Charlottesville, Virginia, (Oct. 13-16, 1991), 165-171.

"International Search Report for corresponding PCT Application No. PCT/US2004/016486", (Mar. 2, 2005), 4 pgs.

Gordon, G. G., "Face Recognition From Frontal and Profile Views", *The International Workshop on Automatic Face and Gesture Recognition*, (1995) 47-52.

\* cited by examiner

FACE IDENTIFICATION VERIFICATION USING 3 DIMENSIONAL MODELING

FIELD OF THE INVENTION

The present invention relates to fact identification verification, and in particular to face identification verification using multiple images of a face to be verified.

BACKGROUND OF THE INVENTION

Security checkpoints are becoming more and more prevalent. In many cases, a manual check is done to verify that a person presenting an identification badge or other form of ID is actually the person identified therein. There are many biometric based systems currently in use. In some situations, such as providing access to buildings during busy times, and in airports, large crowds of people must be correctly matched in a minimum amount of time.

SUMMARY OF THE INVENTION

A checkpoint screening system uses multiple cameras to provide images at different angles of a person to be screened. Different features extracted from the images at different angles are compared to a profile associated with the person to be screened. In one embodiment, the person first provides an ID, such as a drivers license or other identification, and the profile is retrieved. If a match is detected, the person may continue through the checkpoint. If no match is detected, the person may be directed to a different path through the checkpoint for further verification of identity.

A registration process is used to enroll members and obtain a member profile. Three camera angles are utilized to provide a three dimensional based model (i.e. features extracted from a 3D space). Once a 3D representation of the subject is selected, each image of the 3D representation is independently compared against the profile and the decisions from such comparisons are weighted. In one embodiment, the profile is regressively updated if a match is detected. Features corresponding to more recent matching images in the profile are weighted most heavily for the comparison.

In further embodiments, enrolled members may move to an expired member status and be directed to the different path. This may occur when an enrolled member has not used the system for a period of time, or changes to the profile have been made, such as address or other contact information changes. The different path utilizes manual checkpoint processes.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figure 1:
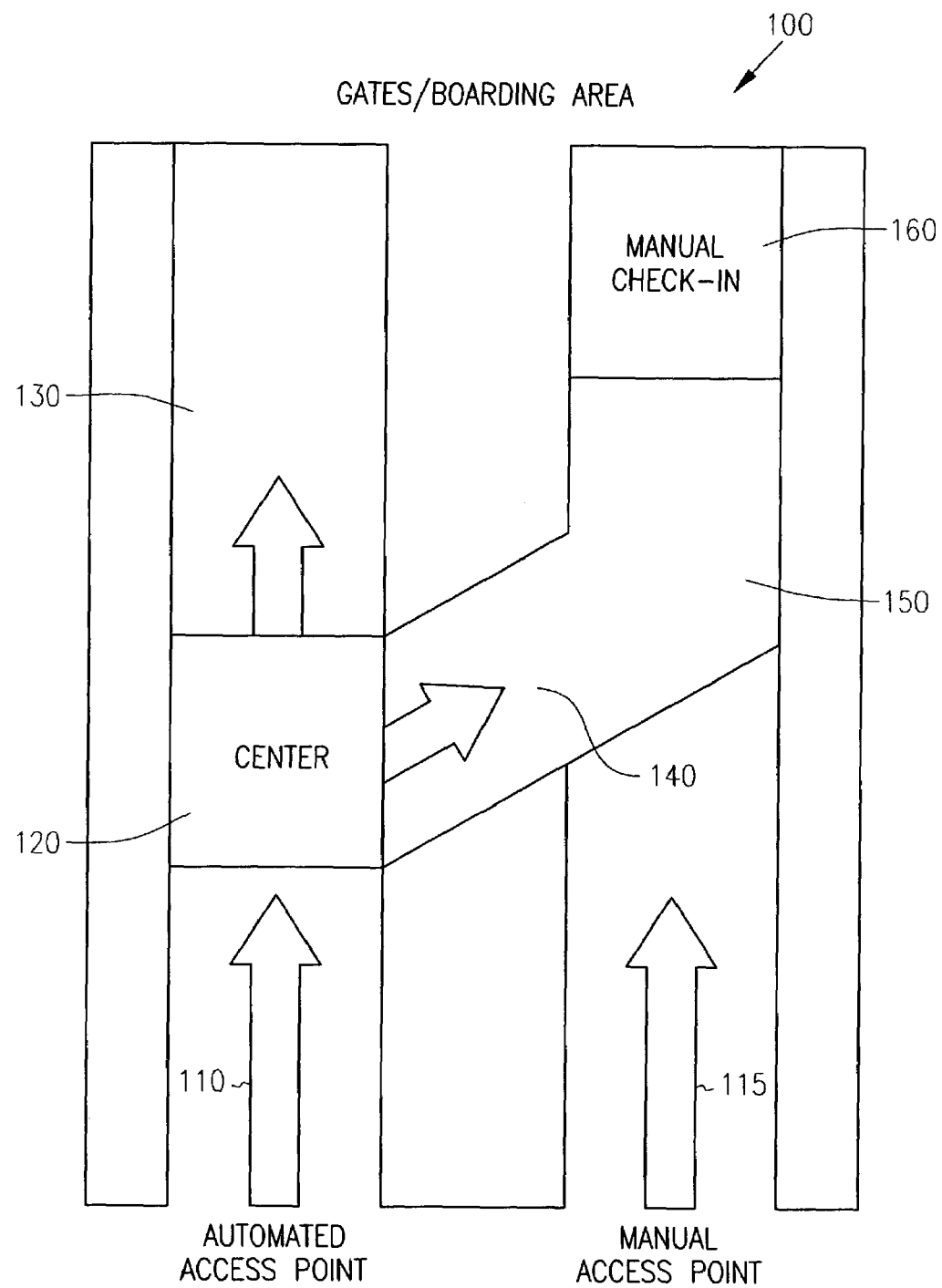
FIG. 1 is a block diagram of an example security checkpoint system using a motion detection system.

A fast access control-screening system as shown generally at 100 in FIG. 1 is used to serve enrolled members. The system processes a large crowd in a short time with minimum cooperation required and at a minimum inconvenience. Face verification engines are used to identify members by comparing images from different angles to stored information about the member. A member ID is presented by the member during use of the system. The ID is used to retrieve the stored information comprising a profile.

Two access points are provided for people to enter the system 100. An automated access point 110 and a manual access point 115 are provided. The automated access point 110 leads to an automated face verification station 120. An ID card or other form of identity may be scanned at this point and information is retrieved for us in comparing images taken at the verification station 120 with the retrieved information. If a match is found, the person is approved and directed proceed through lane 130 to a gate, building or other controlled access area.

In the event that a match is not found, or for other reasons, the person may be directed back into a manual check in lane via lane 140 to manual check in lane 150. Access point 115 also leads to manual check in lane 150. Manual checks are then performed at 160.

To enroll, members present a photo-id and other necessary documents to an operator. The operator matches their identity with an account record and enrolls them into a secure database. During operation, enrolled individuals can then pass through access points while the system captures their pictures, constructs a fused 3D model of the subject and compares it to the account on record. Once individuals are validated, they can proceed directly to access the facility/site/building/gate without having to check through longer lines with the rest of the visitors/customers.

Figure 2:
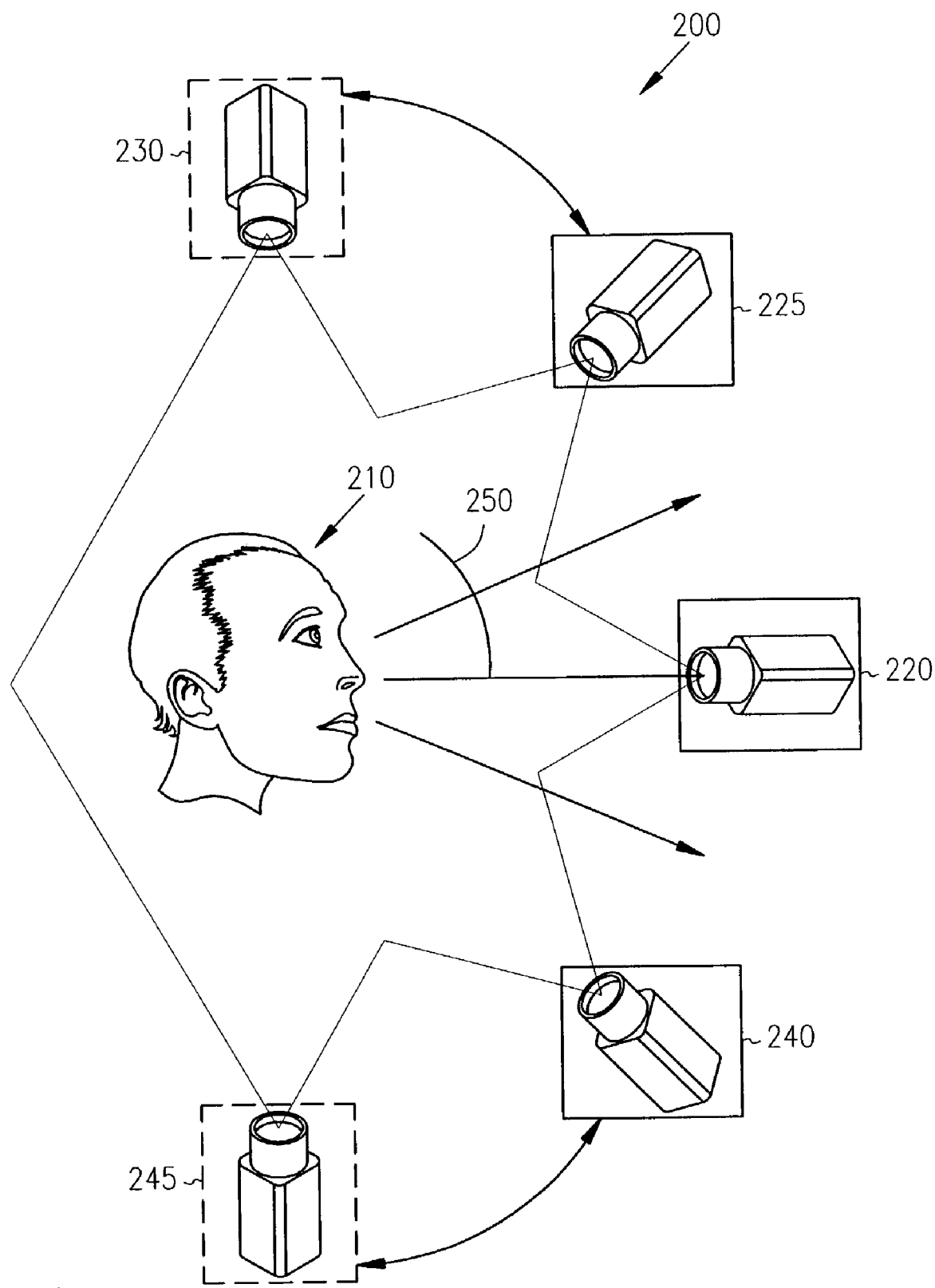
FIG. 2 is a block diagram of an example multiple camera motion detection system of FIG. 1.

The verification station 120 photographs the person at multiple orientations as shown in FIG. 2 using single or multiple bands (i.e. visible or IR sensors as appropriate) to construct a 3D model of the subject. The model is then compared to the passenger profile which comprises a pre-existing feature set to verify his/her identity using text and image based comparison. The personal information may come from the identification that passengers must present/scan when they check in. To pass through the checkpoints, the enrollment card would be read with a card scanner or other input device. The passenger's photo, identity, and access information are matched against the retrieved information from the system database to validate or decline in case of a mismatch. If there is a mismatch, the member would be pointed to use a different lane 150 where an operator/officer will investigate the incident and take corrective actions in case there is a need for a photo update, change of address or alert report to the authority if there is a threat pattern.

At 200 in FIG. 2, a person 210 is photographed by three cameras. In various embodiments, the cameras may be sensors of different wavelength types, i.e. near IR, IR sensors, and two or more such cameras/sensor may be used. A frontal camera 220 is used to capture a frontal face landscape. The frontal landscape or view is analyzed using a mature 2D face ID technology, which can tolerate up to 20 degrees of head orientation. The system is augmented with one or more other outside cameras to cover the remaining range, i.e. 20 to 90 degrees to capture the profile views. A first outside camera 225 is shown at an approximately 20 degree angle as indicated at 250, from the frontal camera. The first camera is also indicated in a second position at 230 at approximately 90 degrees from the frontal camera. Similarly, on an opposite side from the first outside camera 225, a second outside camera 240 at 20 degrees, and 245 at 90 degrees are shown. The outside angles may be varied as desired to obtain optimal results.

The placement of the cameras and each camera's characteristics may vary based on heuristic geometric observations to obtain those most suitable for this application. The angles may be selected to provide the most reliable geometric triangulation of the face information. The camera height and position with respect to the card reader may also vary based on the checkpoint configuration.

As an option, the system can be implemented to include automated passenger profiling as well to provide a system integrated approach to addressing any threat. All checked-in unmatched passengers using the automated check-in system may be subject to profile testing. Profile testing may be triggered if there was no perfect match to the subject in the database. The unmatched passengers are separated into another category, which may present some security risk and may warrant further investigation.

Figure 3:
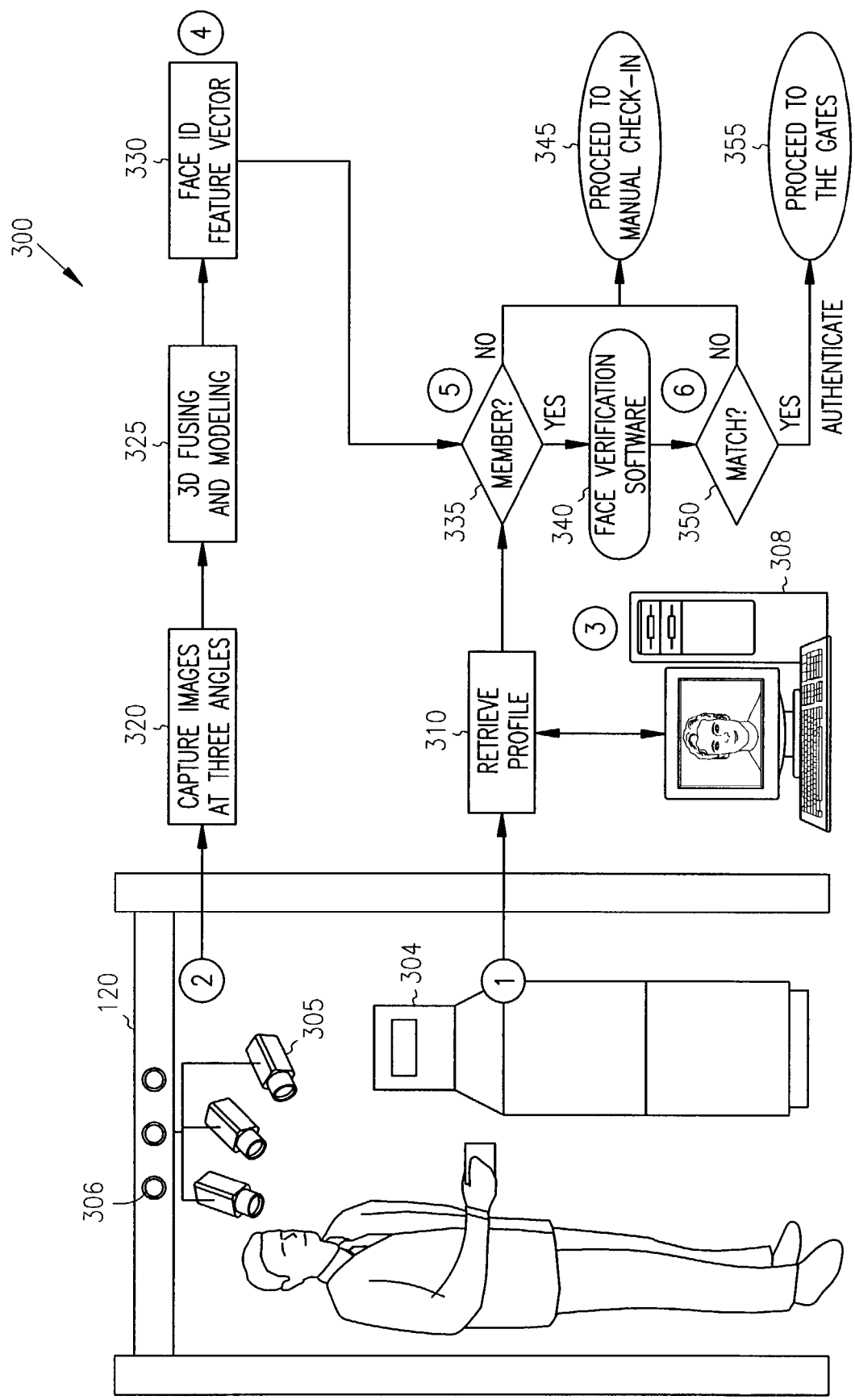
FIG. 3 is a block flowchart diagram of an example process utilized at a security checkpoint.

Verification station 120 is shown in further detail in FIG. 3. The configuration consists of a card scanner system 304 (Controller, digital card reader, and proximity cards), a network of cameras 305, a set of lights 306, cables to link the cameras and PC host with the network, a video streamer, a local area network, and a verification server all represented at 304. In another embodiment, the set of lights may be used to provide ample light if necessary so that the cameras can capture good quality images of the subject. All video cameras may be of a fixed field-of-view type. Outputs of the cameras are fed to the video streamer, which digitizes and compresses the video images. The video streamer is connected to the local area network and hence provides digitized video streams to the verification server. The video server stores the video streams and has the capability to retrieve and display video based on time stamps. The verification server 304 detects the face ID of the subject and makes a match against a secure database of enrolled individuals. The video and verification servers are combined as one. A host machine 308 is positioned next to the checkpoint.

Rules are defined from which to construct the testbed architecture.

Category 1: A "Enrolled member": is a passenger who has enrolled in the past with an updated profile on the system.

Category 2: A "New member" is a passenger who is enrolling in the program for the first time Category 3: An "Expired member" is a former "enrolled member" whose enrollment has expired given that he/she has not used the system for a period of time or changes to his/her profile has been made, i.e. change of address or phone.

To enforce the security regulations, category 2 and 3 are treated similarly by our FACS-5 system as "nonmembers" and will be directed to proceed to a manual checkpoint. Nonmembers are required to visit an enrollment office to enroll for the first time, reactivate membership, or update their profile.

Based the definitions above, a six-stage process is used for the authentication of the automated checkpoint passenger screening. The process is conducted as follows.

Check in: The user starts by scanning his/her identification (e.g. Frequent Flyer card) at 304, Image capturing: Once, the individual presence is detected by the activation of the card reader, the system triggers the camera to capture multiple images 320 of the passenger for face ID processing Profile Retrieval: The FACS-5 retrieves the person's profile at 310 from a server database with specific information, e.g. name, address, phone, photo, and hands this information to the verification software FACS-5 engine for ID verification.

Face ID: The image processing component of the system constructs a 3D model at 325 of the subject and prepares a 3D face ID at 330 (i.e. image based feature vectors) for submission to the face verification software Membership Verification: If the passenger's membership is validated at 335, the passenger's face ID is then sent to the face verification engine 340. Otherwise, the passenger is declined to be checked in using a face verification engine 340 and directed to proceed to a manual checkpoint 345.

Face ID verification: Only passengers with valid membership will have their Face ID verification processed. Once matched at 350, the individual will be authenticated and directed to proceed through the access point 355. In the case of a mismatch, the individual is declined and pointed to proceed to the manual checkpoint 345.

Figure 4:
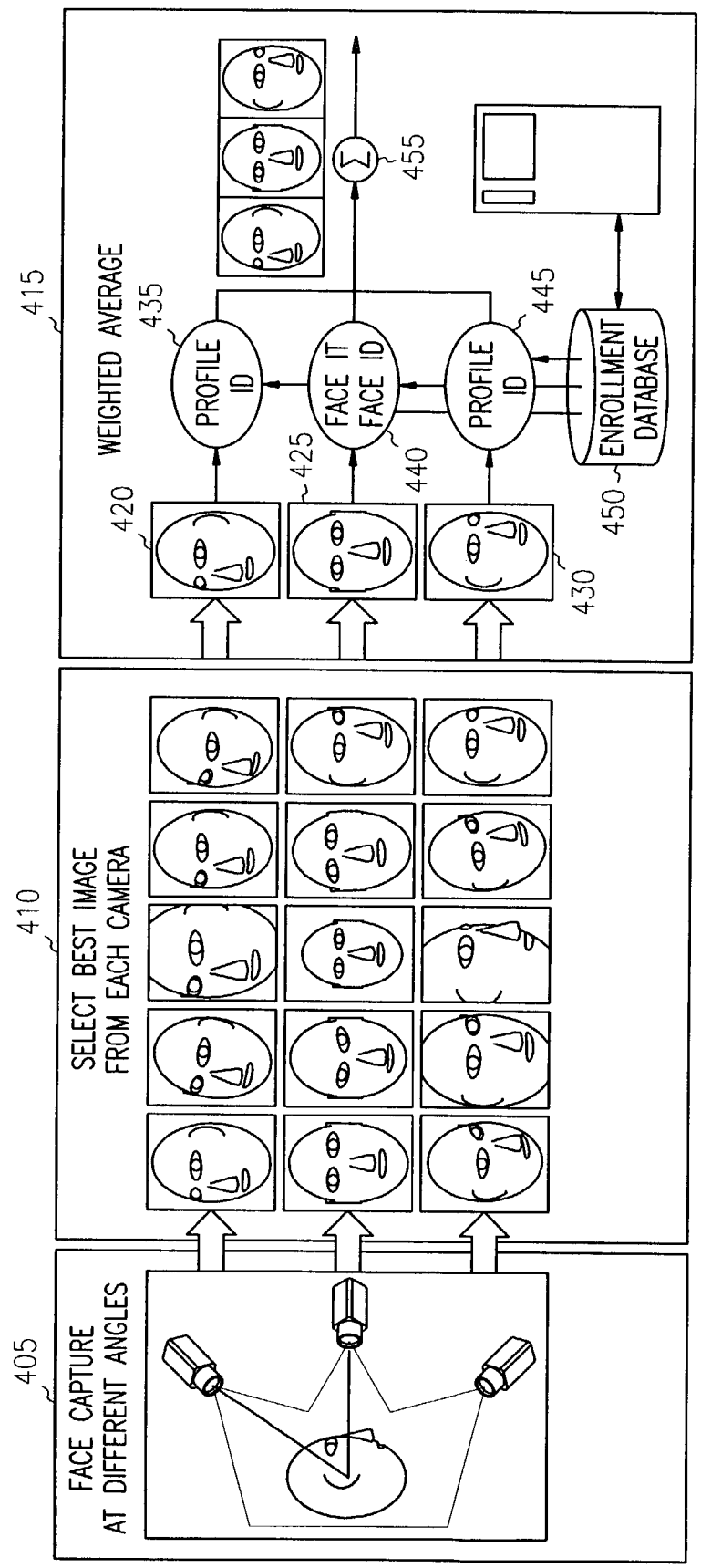
FIG. 4 is a further block diagram of operation of the multiple camera motion detection system

The face verification engine 340 is shown in further detail in FIG. 4. It considers information from both frontal, and profile views of the subjects obtained as indicated at 405. Multiple images are obtained for the frontal and profile views, and a best image set from each subsequent frames (captured at different instants) is selected at 410. The different views provide the ability to fuse different bands to optimize the face detection at 415.

In one embodiment skin detection is used to extract actual features of faces and eliminate disguised portions (i.e. portions of faces with a lot of makeup, hair, etc). Heavy computational processes are not required, so the verification engine is well suited to the checkpoint screening and authentication like application.

A 3D face feature vector as represented at 420, 425 and 430 is constructed from the three independent sensors outputs. One camera is positioned at the frontal landscape of the face view, and the other two cameras are positioned at two optimal angles to capture both the right and left profiles of the subject as previously described. The geometric information of the profile captured by the two cameras on the sides is used to normalize the output of the frontal camera by using a pattern matching technique. The normalized feature vector extracted from the frontal face improves the performance of the 2D Face ID verification tool.

In one embodiment, each of the views is run through a separate verification engine as indicated at 435, 440 and 445 using data obtained from a database 450 containing the enrollment information. Profile based feature sets are used for analysis of features obtained from images of the sensors or cameras providing profile images. Such feature sets may have some different features that are not available from a frontal image, such as nose to ear distance, and facial hair features that may not be detected from the frontal view. Further detail for an example verification engine for a profile based feature set is set forth below.

In one embodiment, Local Feature Analysis (LFA) is used to analyze the frontal image. This technique extracts and analyzes local facial features such eyes, nose, cheeks, mouth, chin and the manner in which they constitute the face. The LFA technique may be augmented by normalizing the captured frontal view using the geometric information from the captured profiles. This unique LFA technology provides additional reliability when applied to normalized image templates. Many LFA tools are commercially available, such as FaceIt from Identix (In another embodiment Cognitec system FaceVacs solution is used). Geometric information may be used to augment the feature set used in the one-to-one matching process; this will reduce the sources of errors due to variations in the frontal view.

As the number of elements in the feature set increases, the distance between a subject and other templates increases, making a pair match more obvious. A weighted average method 455 is used to combine the outcomes of the three one-to-one processes applied on the three views. In addition, local features or nodal points extracted from the profile views are less affected by the face expressions. An example of a nodal point is the chin.

In one embodiment, the face recognition engine includes facial-head motion detection. The head motion that is not limited to the head-silhouette motions (head motion is not enough to discriminate an actual face from a masked face), rather it includes detection of relative small motions of the landmark points of the face with respect to the face landscape, as a result of eye blinking, chick local motions and different face expressions.

In one embodiment, auto regression modeling is used to adapt to face changes over time. When a match is found, older information in the profile is replaced with new information obtained during the checkpoint process. This new information may also be weighted more heavily than the older information, also referred to as a temporal weighting. The information may be representative of features as described above. Feature information may be stored for multiple images during the enrollment process and a weighted average may be used to determine matching of current checkpoint views. As the member utilizes the service over time, older feature sets may be replaced by newer sets measured during us of the checkpoint process. The weights may be adjusted as desired to optimize performance. Too drastic a change results in the no match, and routing to a manual checkpoint station. Such auto regression modeling allows for compensation for slow changes in appearance due to aging, weight loss/gain and other gradual physical changes.

Figure 5:
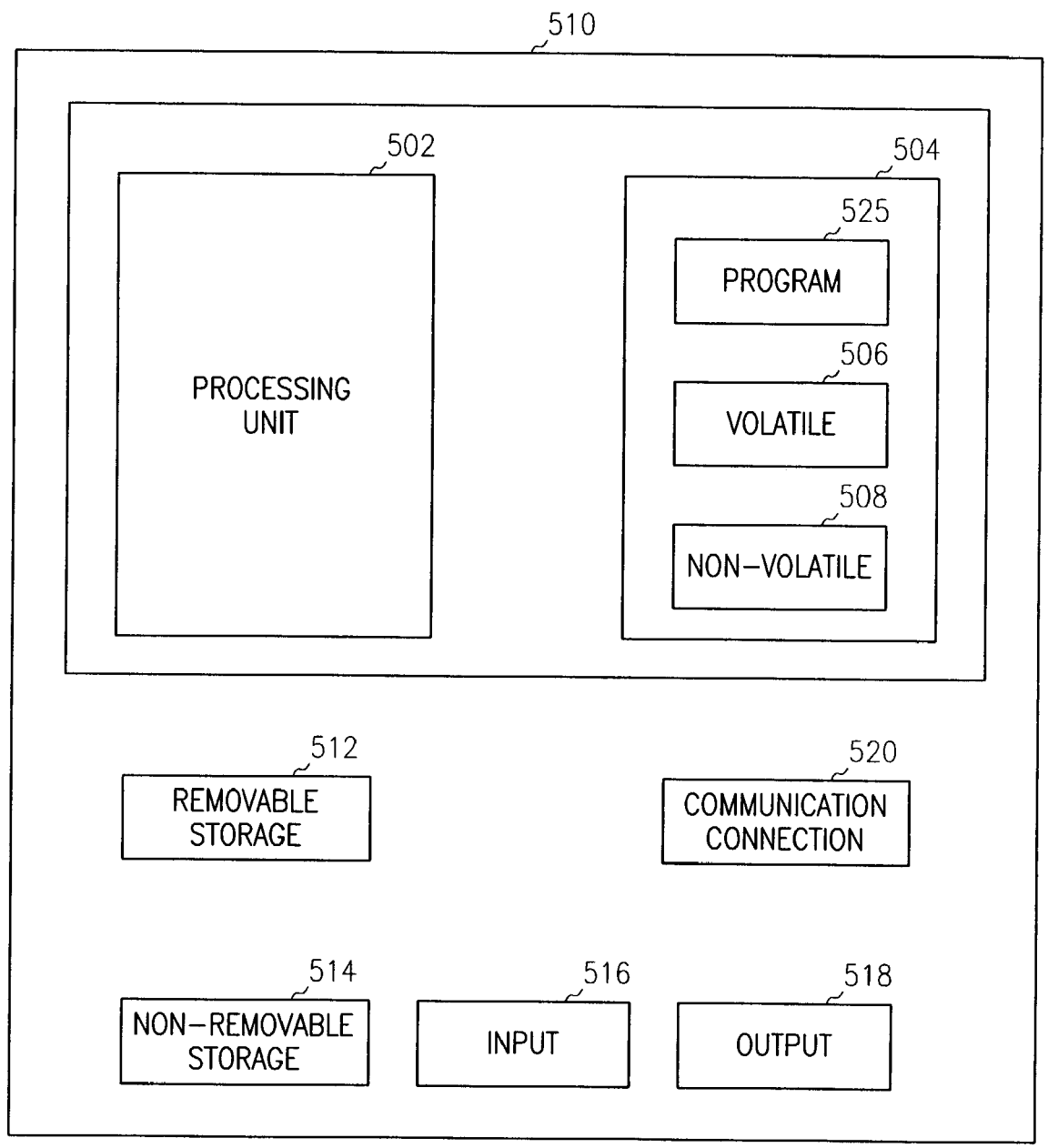
FIG. 5 is a block diagram of an example computer system for implementing selected portions of the security checkpoint system.

A block diagram of a computer system that executes programming for performing the above algorithm is shown in FIG. 5. A general computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes RAM, ROM, EPROM & EEPROM, flash memory or other memory technologies, CD ROM, Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers. The remote computer may include a personal computer, server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a computer-readable medium. For example, a computer program 525 capable of providing a generic technique to perform access control check for data access and/or for doing an operation on one of the servers in a COM based system according to the teachings of the present invention may be included on a CD-ROM and loaded from the CD-ROM to a hard drive. The computer-readable instructions allow computer system 500 to provide generic access controls in a COM based computer network system having multiple users and servers.

Example Verification Engine for Profile Based Feature Set

A 3D object can take on one of a multitude of appearances when projected into a 2D picture domain. This makes the problem of face verification in a 2D domain a difficult one under various lighting conditions and poses. The perspective view of the frontal face geometry as captured in the frames might not match the expected geometry by the 2D-based Face ID engine. Unlike enrollment, during the runtime, tilted, slanted, and oriented views of the frontal viewpoints are expected. The orientation estimation of the face planar surface is an essential component in this problem. For instance, the segmentation, feature extraction and classification procedures are considerably simplified if the effects of the perspective projection are eliminated first, thus reducing the warping effect of the actual face local features. Such local feature analysis which are easily affected by these orientations are mostly relied on in the existing art for face identifications. It is unquestionable that these angular deviations that cause failure of most existing reliable 2D face ID systems and the problem is well recognized in literature. It is desired to provide least effected Face ID when confronted with these angular deviations from the normal frontal face. The system and technical approach herein recovers the actual frontal face plane from the imaging plane (i.e. picture plane as captured by a 2D camera system).

A model based approach is provided to extract a geometric model without constructing an actual 3D CAD representation of the face. The system corrects for any misalignments using perspective projections and triangulation mechanism using three camera system frontal and profile views. In addition to the alignments of the 2D representation of the frontal landscape, face feature vector augmentation provides for better matching of identities.

Face Detection: Many systems work to identify faces in cluttered scenes by employing a face detection preprocessing algorithm prior to face identification. In one embodiment of the present invention, the need for a face detection algorithm is avoided by taking face images against a uniform background in an arrangement where face takes up most of the image frame. Given that the system is based on a controlled scene with a simplified non-complex background, the face detection is assumed to be a straightforward procedure and is solved using the 2D-Face ID solution by allocating the eyes.

Controlled lighting condition: The system is focused on a Face-ID verification scheme to handle varying appearance of Face-ID due mostly to poses and facial expression and occlusion. Illumination is not an issue given that this is a controlled scene and the portal will be exposed to a controlled defused lighting.

Pose selection: The first stage of processing in the face verification architecture is independent of the Face ID verification engine and is limited to pose (i.e. translation and orientation of the head) estimation. The locations of nodal points within the three captured images are used to bring input faces into rough geometrical alignment with the database Face-ID view as described below. Pose estimation is used as a filter on the database views, selecting only those views whose pose is similar to the input's pose. Pose estimation should be considered as an optimization filter to improve upon the 2D system offering.

Normalization procedures: Normalization is conducted on two fronts: 1) the estimation of the head orientation that determines specific pose view with respect to the frontal camera, 2) in addition to the alignment and normalization conducted in the image-place to correct for head orientation, facial feature augmentation is considered for subject misaligned probes that suffer from significant misplacement with respect to the 2D frontal view. Further scaling and positioning is accomplished within the 2D face ID engine.

2D Solution: 2D Face ID used is a parameterized model approach using local feature analysis, i.e. Identix or Cognitec. Any other reliable 2D LFA analysis solution could be used part of the 3D solution.

Memory requirement: The 2D solutions can be configured to store many different samples 2D views of the individual. This is commonly referred to as the view-based approach. The view-based approach handles variation in appearance by simply storing many 2D views of the individual. When attempting to recognize a new input view, the recognizer simply tries to match the input against an example view that is sufficiently close in pose and lighting. Since pose-lighting parameter space is multi-dimensional, populating this space densely enough with example views could require a great list of captured images. In addition, the computational process required to validate all these views increases exponentially.

In various embodiments of the 3D system, the capturing mechanism is based on three cameras, positioned such that one camera is imaging the frontal view of the face, and two placed at an angle symmetrically with respect to the normal of the face to cover the right and left profile viewpoints. It has already been proven that one single camera capturing frontal viewpoint may not be sufficient for face identification if the face is not well placed in the field view. Adding the two sided cameras improves upon the performance, if the frontal camera fails to capture an accurate representation of the front viewpoint.

In one embodiment of the present invention, a sequence of frames at a sequence is grabbed, and the best 3D representation of the individual is selected from the sequence. A 3D representation is defined by the right, left profile, and the frontal images of the individual captured at an instant time (i.e. corresponding to a time t). The best selection of the 3D representation is based on whichever combination that would result in a more accurate 2D representation of the frontal landscape with least head orientation effect.

To accomplish such a selection, two parameters are defined, w(i,t) width between the eyes, and H(i,t) is the relative location of the mid-point of the eyes with respect to the mouth in the face. (i denotes frame indices, and t denotes time).

The 3D pose is selected such that:

$$to = \arg\max \{w(i,t), H(i,t)\}$$

$$\text{over } t, \text{ for } i=2$$

Or, $$\begin{cases} w(2, t_o) = \max w(i, t_o) \\ H(2, t_o) = \max H(i, t_o) \end{cases}$$

The first parameter w(.,.) will determine frames with least head orientation angle, and H(.,.) will determine frames with least elevation angle (slant angle).

Once a 3D pose of the individual is captured, a subsequent process has a two fold solution:

Normalized 2D-solution: The geometric information of the profile captured by the two cameras on the sides is used to normalize the output of the frontal camera by using a pattern matching (i.e. sub-image registration) and warping technique. The normalized feature vector extracted from the frontal face will greatly improve the performance of the 2D Face ID verification tool.

The approach is to determine the face orientation angular using triangulation with respect to the frontal plane and make necessary corrections/warping to generate more accurate representation of the frontal landscape. This corrected normalized frontal landscape will be then fed to the 2D-Face ID engine.

Augmented Features: Geometric information is used to augment the feature set used in the one-to-one matching process; this will reduce the sources of errors due to variations in the frontal view. As the number of elements in the feature set increases, the distance between a subject and other templates increases, making a pair match more obvious. A weighted average method is used to combine the outcomes of the three one-to-one processes applied on the three views.

Normalization 2D Solution

In case of failure to capture a reasonable frontal pose of the face in either camera, the triangulation will not compensate for significant orientations, tilting, and slanting. Another technical approach based on the perspective plane orientations may also be used. Assuming that the enrollment image as the actual frontal view (since it was taken at a very controlled environment), it is estimated that the orientation in space of the planar face surface (2D space presented by the enrollment image) from a single frontal imaging viewpoint captured during runtime. (This single frontal image with some orientation of the head was depicted to be the best available frontal frame that provides the maximum width and height parameters defined above). A more accurate model of the frontal captured image and its respective projection in the imaging plane are derived. The orientation in space of the face planar surface from a single frontal perspective of the camera is estimated.

To solve the perspective transformation, the analysis involves a high-order partial-differential equation. In the following a pinhole perspective projection model is used to provide an estimate of the geometric view of the actual meter from the camera perspective.

A camera plane coordinate system, $\vec{x}_c = (x_c, y_c)$ (imaging plane coordinates) and the actual individual face plane coordinate $\vec{x}_0 = (x_o, y_o)$ are assigned. The elevation angle of the face normal vector is used for representing the vertical orientation of the face. The elevation angle, $\alpha$, is the angle between the face normal and the camera system axis. The tilt angle, $\beta$, is used to denote the angle between x-axis and the projection of the face normal onto the imaging plane. $\theta$ is denoted to be the angle between the mid point of eyes and the back projection of the image tilt vector ($\cos \beta$, $\sin \beta$) on the face plane. The tilt vector is associated with the elevation angle and indicates how much the surface of the face is titled from the perspective of the imaging plane. Thus, the coordinate transformation from the actual meter to the imaging plane is given by $$\vec{x}_c = \mathcal{R}_\beta T_\alpha \mathcal{R}_\theta \vec{x}_o$$

where
$$\begin{cases} \mathcal{R}_\beta = \begin{bmatrix} \cos\beta & -\sin\beta \\ \sin\beta & \cos\beta \end{bmatrix} \\ T_\alpha = \begin{bmatrix} \cos\alpha & 0 \\ 0 & 1 \end{bmatrix}; \\ \mathcal{R}_\theta = \begin{bmatrix} \cos\theta & -\sin\theta \\ \sin\theta & \cos\theta \end{bmatrix} \end{cases}$$

To extract the actual coordinates of a point P(x,y) captured in the imaging plane, the original coordinates are expressed as an inverse transformation of a point on the image plane to a point on the meter surface plane due to the perspective back projection, as follows $$\begin{pmatrix} x_o \\ y_o \end{pmatrix} = \begin{pmatrix} \cos\theta \sec\alpha (x\cos\beta + y\sin\beta) + \sin\theta (y\cos\beta - x\sin\beta) \\ -\sin\theta \sec\alpha (x\cos\beta + y\sin\beta) + \cos\theta (y\cos\beta - x\sin\beta) \end{pmatrix}$$

It will require more than just three equations to solve for the three angles. In the following, two simplified analyses are presented by imposing additional assumptions.

Assume that the back projection onto the face plane of the imaging tilt vector is superimposed on the mid-point of eyes, i.e. $\theta = 0$; Under this condition, the problem is a two step solution:

First, solve for the tilt angle by using the following polynomial $$\sin^2(\beta)(x^2 + y^2) + 2xy_o \sin(\beta) + (y_o^2 - y^2) = 0;$$

Once $\beta$ is computed, replace its value to equation (2) to compute for the elevation angle $$\alpha = \sec^{-1}\left(\frac{x_o}{(x\cos\beta + y\sin\beta)}\right)$$

In most practical cases, in lieu of solving for these unknown angles using the above equations and views triangulations, estimate the kernel transformations using empirical data mapping. For example, define a LUT for all possible orientations of the eyes taking into account the fact that the cameras are symmetric with respect to the frontal face landscape.

To estimate the pose of the face in the profile images (captured using the right and left cameras), use the relative locations of the eyes in the face. Given a human head seen from above, the distance d between the projections of the mid-point of the eyes (i.e. corresponds to the nose location as well) and the normal of the image plane for both right and left profile cameras can be calculated. With zero orientations, the distance should be identical for both cameras and is defined as follows:

$$d_1 = d_3 = r\sin\left(\frac{\pi}{2} - \Theta_o\right),$$

Where r is the head radius. Any discrepancy among both $\theta_1$, and $\theta_3$, indicates that the head is not lined up with the imaging plane (with respect to the frontal camera). For instance, assume that the head is oriented with a $\delta$ angle: then $$\begin{cases} d_1 = r\sin\left(\frac{\pi}{2} - \Theta_o + \delta\right) \\ d_3 = r\sin\left(\frac{\pi}{2} - \Theta_o - \delta\right) \end{cases}$$

The head is tilted to the left; hence the profile images are no longer symmetric. The asymmetry among these two images is proportional to the head orientation angle. The angular measurements are used part of the normalization process of the frontal image.

One may use the ratio between the two distances to eliminate the unknown variable r. A look-up table is then generated to define different nonlinear transformation based on the above measurements.

These nonlinear transformation accounts not only for the head orientation but also its positioning (shifting) with respect to the normal of the mid frontal camera.

Once the transformation is measured, if the captured image undergoes some angular tilting, orientation due to uncontrolled sensing conditions, the necessary process may be added to correct for the warping operations. Warping technologies solve for these kinds of problems. In this framework, there is more control on the sensing conditions during enrollment and limited control during the runtime.

2D Face ID engine: Once normalized, the image is then passed to a 2D Face ID engine. Local Feature Analysis (LFA) is used to analyze the frontal image. This technique extracts and analyzes local facial features such as eyes, nose, cheeks, mouth, chin and the manner in which they constitute the face. The LFA technique is augmented by normalizing the captured frontal view using the geometric information from the captured profiles, as described above. This unique LFA technology provides additional reliability when applied to normalized image templates. Many LFA tools are commercially available, such as FaceIt from Identix or FaceVacs from Cognitec.

Feature Augmentation

This section presents a unique face recognition system which considers from both frontal and profile view images. This approach represents the first step toward the development of a face recognition solution based on an actual 3D model approach. A stereo imaging approach used geometric information for view normalization and warping and image registration is based on general pattern matching techniques.

In this embodiment, a 2D face feature vector is augmented to a 3D face feature vector. Geometric information is used to index the reference database to quickly tabulate some matches and confirm authentication of individuals for which 2D face ID engine performed poorly (i.e. inadequate for airport security scrutiny levels).

The verification process begins by computing a 3D feature vectors or model for the gallery images and the probe images. The models constructed from the gallery image form the reference-indexed database. An index is created for the reference database, which groups the models based on basic geometric measures extracted from the three frames. This index allows quick associations of those subjects in the database and whether the probe belongs to the appropriate dataset. In case of no profile match is found, the profile similarity score of that specific feature vector is zeroed out. If the probe belongs to the same gallery family, then a high score is given to reflect perfect match. The final step is to weigh in the comparison 2D frontal score with the query model. The bases of the profile scores are normalized image features extracted from the profile images. Any robust pattern matching algorithm could be used. In one embodiment, a cross correlation technique is used. The 2D frontal image provides a similarity score separately based on the 2D face ID engine, described above.

The profile features contains the location of key nodal points on the face in a 3D coordinate system. The profile view is similar to processing of the frontal view, except that only limited points are available than those in the frontal landscape. Some of nodal points depend on the relative location of the tip of the nose, chin, eyes, and ears (as captured) with respect to a reference point. In one embodiment, the chin was used as the point of origin. Feature points are extracted using standard morphological operators, pattern matching and low-level image analysis algorithms. All measures are then normalized with respect to the silhouette of the head size and relative measures are extracted for database pruning. Pattern matching is used to extract profile features. Any other typical approaches can be used to extract the nodal point tips using standard computation of local curvature extrema and geometric tangency constraints.

In one embodiment, a fusion analysis exhibits two levels of fusions. Profile features are used to normalize the frontal landscape. Then, the 2D feature vector is augmented with additional profile features using a weighted average sum of the similarity score, as described below.

The final stage of the proposed process is to combine all outcomes and assess simulation for authentication. The decision is combinatorial and is based on both frontal and profile analysis. An average weight approach is used to combine both outcomes using predefined weights. The final similarity score is defined as follows:

$$\sigma_{3D} = \frac{\omega_1 \cdot \sigma_{p1} + \omega_2 \cdot \sigma_f + \omega_3 \cdot \sigma_{p3}}{\sum \omega_i}$$

Where $\sigma_f$ is the similarity score of the frontal based analysis. The predefined weights are computed empirically prior runtime.

The addition of 3D data should improve system performance by disambiguating effects of misaligned views. This improvement is accomplished in two stages. First, the normalization and correction of the frontal landscape using the geometric information captured in the three camera systems. Second, the augmentation of the feature vector with profile measures. The sided cameras provide the 3D dimension, e.g. relief or depth of the face, which is not available from the 2D frontal view.

CONCLUSION

An automated system provides visitors fast screening through sensitive access checkpoints, e.g. airport checkpoints and high-end building access checkpoints. The system leverages an investment in technology and trained people. By utilizing this system, operators/guards/patrols can better focus their resources and attentions on unknown profiles. As a result of this effort, many legitimate visitors/travelers may never see an agent while crossing these checkpoints. The system addresses the need for a highly reliable automated checkpoint fast screening system that speeds the task of positively identifying members and matching them with their photos using a Face ID technology to check them in through access checkpoints.

Membership may expire after a period of time to account for facial changes of time. Face recognition uses normalized frontal analysis during a six-stage process for validations. Head motion detection is not limited to the head-silhouette motions (head motion is not enough to discriminate an actual face from a masked face), rather it includes detection of relative small motions of the landmark points of the face, as a result of eye blinking or different face expressions Sensor Fusion is deployed to extract actual features of the face. For example, in one embodiment skin detection is used to extract actual features of faces and eliminate disguised portions (i.e. portions of faces with a lot of makeup, hair, etc).

The invention claimed is:

1. A method of matching faces, the method comprising:
   obtaining a front view image of a face to be matched;
   obtaining a profile view image of the face to be matched from an angle off the front view;
   generating image features from each of the view images wherein front view image and the profile view image from an angle off the front view comprise different features;
   combining the image features from each of the view images into a combined feature set;
   comparing the combined feature set to a profile, wherein features from the profile view image are used to normalize the features obtained from the front view image prior to comparing the combined feature set to the profile; and
   determining a match based on the compared image features.

2. The method of claim 1 wherein the profile is updated if a match is determined.

3. The method of claim 2 wherein the profile comprises a set of features, and wherein such features are updated based on features identified in the view images.

4. The method of claim 3 wherein a feature comprises multiple weighted data points.

5. The method of claim 4 wherein most recent data points are more heavily weighted.

6. The method of claim 1 wherein one feature of the image from an angle comprises distance measurements of nose, ear and other landmarks to a relative nodal point in the face landscape.

7. The method of claim 1 and further comprising obtaining a further view image of the face to be matched from an angle off the front view in the other direction from the other angled view.

8. The method of claim 1, wherein at least one feature from the profile view image is not available from a valid front view image.

9. The method of claim 8 wherein a valid front view image may be obtained from a camera positioned within 20 degrees of straight on to the face.

10. The method of claim 1 wherein normalizing the features comprises a perspective transformation to provide a desired orientation in space of a frontal plane of the face.

11. A method of matching faces, the method comprising:
obtaining multiple front view images of a face to be matched;
obtaining a profile view image of the face to be matched from an angle off the front view, wherein at least one feature from the profile view image is not available from a valid front view image;
selecting one of the multiple front view images;
generating image features from each of the view images wherein the front view image and the image from an angle off the front view comprise different features;
combining the generated image features from each of the view images into a combined feature set;
comparing the combined feature set to a profile, wherein features from the profile view image are used to normalize the features obtained from the selected front view image prior to comparing the combined feature set to the profile; and
determining a match based on the compared image features.

12. A system for matching faces, the system comprising:
means for obtaining a front view image of a face to be matched;
means for obtaining a profile view image of the face to be matched from an angle off the front view;
means for generating different image features from each of the view images;
means for normalizing the front view image features as a function of the profile view image features and comparing the normalized image features to a profile; and
means for determining a match based on the compared image features.

13. A method of checking identity at a security checkpoint, the method comprising:
reading an ID for a person desiring to proceed through the checkpoint;
obtaining multiple laterally spaced views of the person, wherein the laterally spaced views comprise a front view and at least one profile view;
deriving feature sets from each of the views, wherein at least some of the features are not obtainable from any frontal view of the person;
combining the derived feature sets into a single feature set containing different features from each of the views;
retrieving pre-existing feature sets corresponding to information on the ID; and
comparing the derived feature set to the pre-existing feature sets to determine whether they match, wherein features from at least one laterally spaced view are used to normalize the features obtained from at least one front view image prior to comparing the single feature set to the pre-existing feature sets.

14. The method of claim 13 and further comprising directing the person to a manual security station if there is no match.

15. The method of claim 13 and further comprising enrolling a person to create the pre-existing feature set.

16. The method of claim 15 and further comprising determining whether a person is an expired member.

17. The method of claim 13 and further comprising updating the pre-existing feature set upon detecting a match.

18. The method of claim 17 and further comprising temporally weighting feature sets.

19. The method of claim 13 wherein at least one of the views is a profile view.

20. The method of claim 13 wherein the laterally spaced views comprise a frontal view and two profile views on opposite sides from the frontal view.

21. The method of claim 20 wherein the profile views are spaced between approximately 20 and 90 degrees from the frontal view.

22. The method of claim 13 and further comprising detecting motion between features.

23. A security checkpoint system comprising:
means for reading an ID for a person desiring to proceed through the checkpoint;
multiple laterally spaced sensors for obtaining multiple laterally spaced views of the person, wherein the laterally spaced views comprise a front view and at least one profile view; and
a verification engine that derives a combined feature set from feature sets from each of the views wherein the combined feature set includes only different features from multiple views, normalizes front view image features of the combined feature set as a function of the one or more features from at least one laterally spaced view, retrieves pre-existing feature sets corresponding to information on the ID and compares the combined feature set to the pre-existing feature sets to determine whether they match.

24. A method of matching faces, the method comprising:
obtaining a front view image of a face to be matched;
obtaining a profile view image of the face to be matched from an angle off the front view;
generating image features from each of the view images wherein front view image and the profile view image from an angle off the front view comprise different features;
combining the image features from each of the view images into a combined feature set;
comparing the combined feature set to a profile;
determining a match based on the compared image features;
if a profile match is determined, updating such profile, wherein the profile comprises a set of features, wherein such features are updated based on features identified in the view images, wherein a feature comprises multiple weighted data points, and wherein most recent data points are more heavily weighted.

* * * * *